United States Patent [19]
Blish, II et al.

[11] Patent Number: 6,015,280
[45] Date of Patent: Jan. 18, 2000

[54] APPARATUS FOR REDUCING WARPING OF PLASTIC PACKAGES

[75] Inventors: Richard C. Blish, II, Saratoga; Sidharth, Santa Clara, both of Calif.

[73] Assignee: Advanced Micro Devices, Sunnyvale, Calif.

[21] Appl. No.: 08/840,343

[22] Filed: Apr. 28, 1997

[51] Int. Cl.$^7$ .............................. B29C 45/02; B29C 45/14
[52] U.S. Cl. ..................... 425/116; 264/272.17; 425/544; 425/588
[58] Field of Search ..................................... 425/116, 117, 425/544, 588; 264/272.17

[56] References Cited

U.S. PATENT DOCUMENTS

| | | | |
|---|---|---|---|
| 4,126,292 | 11/1978 | Saeki et al. | 425/588 |
| 4,741,507 | 5/1988 | Baird | 425/116 |
| 4,954,308 | 9/1990 | Yabe et al. | 425/116 |
| 5,123,826 | 6/1992 | Baird | 425/544 |
| 5,302,101 | 4/1994 | Nishimura | 425/544 |
| 5,645,864 | 7/1997 | Higuchi | 425/117 |

FOREIGN PATENT DOCUMENTS

| | | | |
|---|---|---|---|
| 55-140541 | 11/1980 | Japan | 264/272.17 |
| 57-8138 | 1/1982 | Japan | 264/272.17 |
| 60-63121 | 4/1985 | Japan | 425/117 |
| 61-162311 | 7/1986 | Japan | 425/588 |
| 63-49413 | 3/1988 | Japan | 264/272.17 |
| 3-153329 | 7/1991 | Japan | 425/588 |
| 6-91687 | 4/1994 | Japan | 425/544 |
| 2248580 | 4/1992 | United Kingdom | 425/116 |

*Primary Examiner*—Robert Davis
*Attorney, Agent, or Firm*—LaRiviere, Grubman & Payne, LLP

[57] ABSTRACT

Methodology for reducing the warpage in thinly packaged electrical components, and electrical components packaged according to the method. The method taught herein is to make the gates themselves compliant, or flexible, thereby absorbing the stresses which would otherwise cause package deformation, including warpage. The present invention teaches two preferred embodiments for attaining this novel solution, including the adoption of wide, thin gates and the use of serpentine gates.

10 Claims, 2 Drawing Sheets

SECTION A-A'

APPARATUS FOR REDUCING WARPING OF PLASTIC PACKAGES

TECHNICAL FIELD

The present invention relates to the plastic packaging of electronic components. More particularly, the present invention relates to plastic resin encapsulation of integrated circuits; to a methodology for reducing warpage of the packages, and to electronic components, including plastic-resin encapsulated integrated circuits, produced according to the method.

BACKGROUND OF THE INVENTION

The following discussion of the art of the plastic packaging of electrical components, especially of integrated circuits is, in part, summarized from Chapter 18, "Packaging" in *Microchip Fabrication*, pp 539–586, Peter van Zant, McGraw-Hill, 1997. This background information is herewith incorporated by reference.

After wafer fabrication, semiconductor chips undergo several processes to prepare the chips for eventual use. By way of illustration, but not limitation, some of these processes include: backside preparation; die separation; die pick; inspection; die attach; wire bonding; pre-seal inspection; package sealing; plating; trimming; marking; and final testing. Many of these processes can be categorized as part of the packaging, or enclosure process.

One form of enclosure common to semiconductor or integrated circuit (IC) manufacture is the molded epoxy package. Epoxy packages perform the four basic requirements of an electronic package for the circuit chip, or die ("chip"), they house: they support a substantial lead system for connecting the device to the system component which will utilize it; they provide physical protection of the device from breakage, contamination and abuse; they protect the device from environmental hazards such as chemicals, moisture and gasses which could interfere with device performance; and they provide a path for dissipating the heat generated by the functioning of the device. Epoxy packaging presents several major advantages over some other device packaging technologies: it is light in weight, low in cost, and high in manufacturing efficiency.

One method of epoxy packaging of semiconductor devices is summarized as follows, and is illustrated in prior art FIGS. 1 and 2. Having reference to those figures, this methodology is explained as follows: after die separation (and in some cases, after some of the previously mentioned steps, the die, 1', concentric with device 1, is attached and bonded to a composite lead frame, 2. In the exemplar here presented, lead frame 2 includes horizontal rails, 5, and vertical tie bars, 7, and provides a plurality of lead systems for connecting to the semiconductor dice (not shown), thereby producing the useful individual device. In this example there are provided a plurality of individual device lead frames 2, each having mounted thereon a further plurality of dice, 1'. After die mounting, the lead frames having the dice mounted thereon are often given some form of pre-seal inspection.

After the pre-seal inspection, the lead frames are transferred to a molding apparatus. Commonly used in this procedure is a transfer molding process which encapsulates and surrounds each of the dice and at least a portion of the lead frame assembly with a plastic encapsulant. Commonly utilized plastic encapsulants include, but are not limited to: epoxies, monomers, polymers, and other thermoplastic, thermosetting, and thermoforming resins. In the exemplar here presented, a silica-filled epoxy is utilized as the encapsulant.

The lead frames are placed in a mold, here a two-part mold consisting of mold halves 20 and 21. At least one mold half, often the bottom, has formed therein a gate, 10. The mold halves are clamped together, typically with some force, and often a portion of the lead frames, 2, completes the mold cavity, 16. The vent, 24, which provides a path for escaping air during the transfer molding process, is typically filled with the encapsulant during that operation.

After the mold has been clamped about lead frames 2 and dice 1', the molding apparatus is charged with a quantity of epoxy material, for instance as beads, through sprues 14. The epoxy material may have been previously softened by means of heating or chemical reaction. The transfer molding apparatus then induces pressure, usually by means of a ram in operative combination with sprue 14, on the molten, viscous epoxy and it flows from sprues 14 through a series of runners, 12, thence through tapered sections 11 of gates 10, and thence into mold cavities 16. As the ram (not shown) continues to apply pressure to the mass of liquid epoxy, it is then forced around the dice, 1', encapsulating the dice and forming the individual packages, or devices, 1.

After the epoxy is at least partially set, the molds are separated, and the lead frame assembly is removed therefrom. This assembly may then be further cured by an oven or other heat means. Following final curing, the packages undergo further processing including, but not limited to: plating; runner removal; de-flashing; marking; and final testing. The finished packaged component is then ready for use.

The preceding discussion presents a broad overview of the plastic packaging of electrical components, as practiced by others having ordinary skill in the art. Details of one example of such a molding process can be found in U.S. Pat. No. 4,697,784 to Schmid.

A recent trend in the semiconductor industry, particularly relating to integrated circuit (IC) manufacture, is the emergence of smaller package forms for packaging ICs. These smaller forms may be referred to as flat packs (FPs), thin small outline packages (TSOPs), small outline ICs (SOICs), ultrathin packages (UTPs), or quad flat packs (QFPs). Each of these packages is constructed in similar fashion as dual in-line packages (DIPs) but are designed with smaller height profiles and typically have their leads bent out to the side of the package. It will accordingly be appreciated that for a given size die, encapsulating the die in one of these thin packages decreases the proportion of plastic encapsulant with respect to the integrated circuit contained therein.

The adoption of thin packages has enabled the implementation of integrated circuit technology in applications previously unavailable. The fabrication of these thin packages however presents new challenges to the manufacturer thereof. A major new challenge is the increased failure rate of thin packages, particularly TSOPs, due to warpage.

The exact mechanism causing this increased warpage rate in TSOPs is still under investigation. It is surmised that perhaps a differential curing rate between the relatively massive sprue/runner/gate structure and the thinly clad dice may have an effect on warpage. It is known that some thermosetting materials, including some epoxies, tend to cure more readily in larger masses, while thinner films of the same material cure more slowly under identical conditions.

What is needed then is a methodology to reduce the warpage in thinly packaged electrical components, preferably without substantially altering the physical size of either the packaged die, or the package itself. The methodology should preferably be implementable on existing transfer molding equipment. The methodology should further be implementable using existing encapsulants, and generally be capable of economic implementation.

DISCLOSURE OF INVENTION

The present invention teaches a methodology for reducing the warpage in thinly packaged electrical components. The methodology taught herein accomplishes this end without altering the physical size of either the packaged die, or the package itself. The methodology is implementable on existing transfer molding equipment, using existing encapsulants, and is capable of economic implementation.

One hypothesis which explains the previously discussed warpage rate in thin packages is that the sprue/runner/gate structure cures faster than the package itself, thus becoming more rigid than the devices formed thereon. Further, that small changes in physical size of the more rigid sprue/runner/gate structure accompanying that structure's cooling may induce physical stresses on the differentially less rigid package. In removing the lead frames including the sprue/runner/gate/package structure from the molds, it may be that in order to minimize these stresses, the relatively less rigid, relatively thin packages deform as opposed to the relatively large, relatively more rigid gate/runner/sprue structure. In any event, these stresses are known to exist and must be negated.

The solution presented by the present invention is to make the gates themselves compliant, or flexible, with respect to both the runner and the package. This compliant gate de-couples the forces which would otherwise cause package deformation, including warpage. The present invention teaches two preferred embodiments for attaining this novel solution, including the adoption of wide, thin gates and the use of serpentine gates. Moreover, the present invention relates to electrical components packaged according to the principles set forth herein.

Other features of the present invention are disclosed or apparent in the section entitled "BEST MODE OF CARRYING OUT THE INVENTION".

BRIEF DESCRIPTION OF THE DRAWINGS

For fuller understanding of the present invention, reference is made to the accompanying drawing in the following detailed description of the Best Mode of Carrying Out the Invention. In the drawing.

Figure 1:
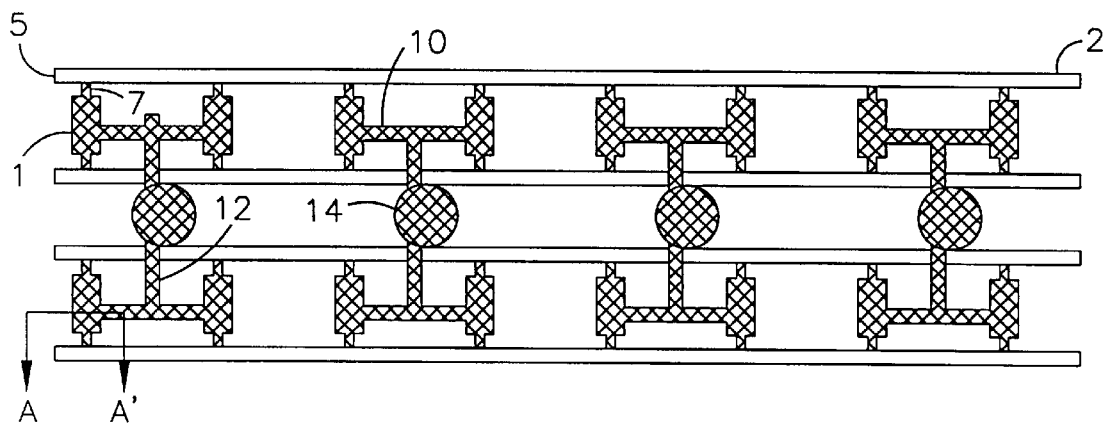
FIG. 1 is plan view of a previous lead frame having molded thereon a plurality of sprue/runner/gate/device structures, and removed from the mold which formed it.
Figure 2:
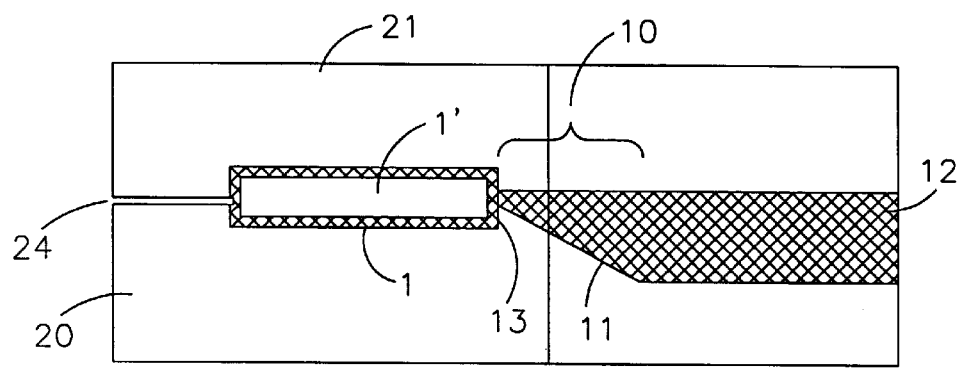
FIG. 2 is a transverse section through a portion of the mold which formed the previous sprue/runner/gate/device structures.

Reference numbers refer to the same or equivalent parts of the invention throughout the several figures of the drawing.

BEST MODE OF CARRYING OUT THE INVENTION

Having reference again to FIG. 1, runner 12 is typically a (relatively) massive structure having typical dimensions of around 3 mm by 3 mm in section. In contrast, device 1 is typically ~1 mm in thickness, which package encapsulates a silicon chip or die, 1', approximately 0.5 mm in thickness. This means that the layers of encapsulant on top of and on the bottom of the chip are on the order of 0.25 mm in thickness. Further, this thin structure is rigidly connected to a massive runner 12 by a relatively massive gate 10. Each gate 10 consists of a sharply tapered section 11 and a gate orifice 13. Gate orifice 13, in one TSOP fabrication regimen, has a cross-section of approximately 0.5 mm by 10 mm, which communicates with tapered section 11, tapering in thickness from 0.5 mm at gate orifice 13 to the previously discussed 3 mm dimension of runner 12. The taper of section 11 is on the order of 45°.

By reducing the taper of the gate, the gate may be made compliant, thereby mechanically de-coupling the thin package from the relatively massive runner. One such mold design is shown in FIG. 3, and implements a first preferred embodiment of the present invention.

Figure 3:
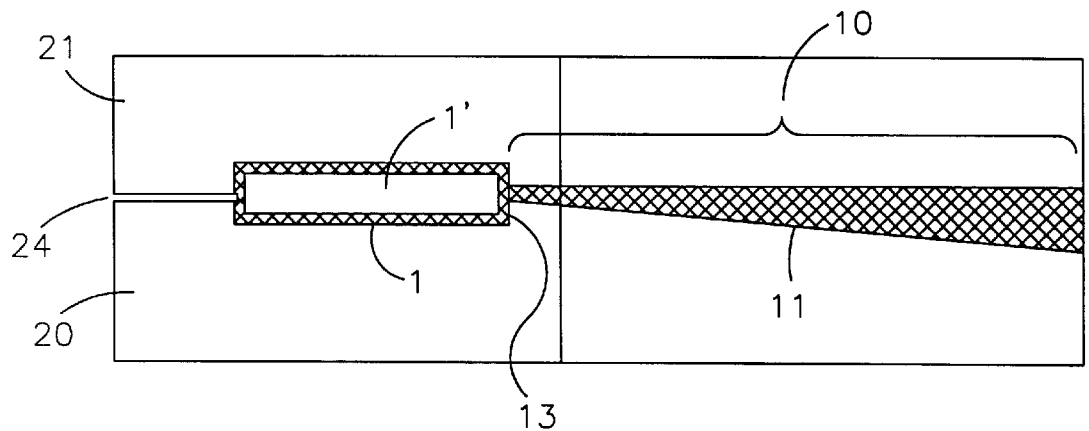
FIG. 3 is a transverse section through a portion of a mold formed in accordance with the a first preferred embodiment of the present invention.

Referring now to FIG. 3, a transverse section through a novel mold structure implementing a first preferred embodiment of the present invention is shown. In this embodiment, gate 30 is formed with an angle of between 2° and 10°, more preferably between 3° and 7°. In this exemplar, gate 30 is formed with an included angle of 5°. This more gradual taper angle is capable of implementation on existing transfer molding processes and equipment. An estimation of the Reynold's Number for transfer of the viscous encapsulant through this gate geometry further suggests that the critical transition between laminar and turbulent flow will not occur until a flow rate several (~5) orders of magnitude greater than currently available is imposed on the encapsulant.

Further, a Poiseuille's Law study indicates that the pressure drop for a given flow rate varies inversely as the fourth power of the smallest dimension for the orifice (i.e., the smaller of the height or width of the gate orifice). Accordingly, a weighted average of the pressure drop along the length of a shallowly tapered gate, as shown at 30, will be dominated by the smallest value (the height) and not particularly perturbed by other values related to encapsulant flow.

Still further, the (bending) stiffness of the gate which couples the massive runner, 12, to the fragile IC chip, 1', is shown to be a strong function of the taper angle since bending stiffness generally varies as the cube of the thickness and inversely as the cube of the length. In this exemplar, the reduction of gate taper from a previous value of 45° to a preferred value near 5° results in an reduction of coupling stiffness (bending) by several orders of magnitude. The weighted thickness of the taper and its length define the coupling stiffness. Both thickness and length are a function of the included angle.

Figure 4:
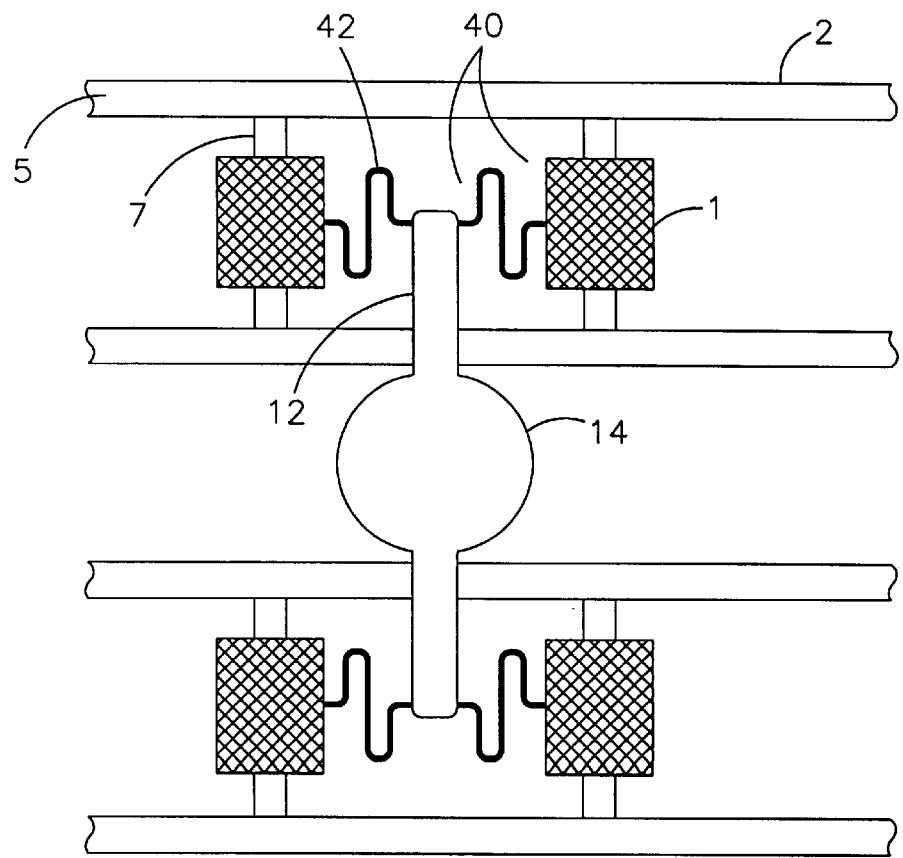
FIG. 4 is a plan view of a lead frame having molded thereon a plurality of sprue/runner/gate/device structures, the gate portion of which is constructed in accordance with a second preferred embodiment of the present invention.

A second preferred embodiment of the principles of the present invention implementing a serpentine gate, 40, is shown in FIG. 4. According to this embodiment, the mechanical de-coupling of device 1 from runner 12 is accomplished using serpentine gate 40, comprising a first U-shape bend and a second U-shaped bend, as shown. This embodiment achieves de-coupling by providing a substantially resilient, or compliant section, 42 to gate 40 whereby induced load between the runner and the device is absorbed by the elastically conformable serpentine section.

The present invention has been particularly shown and described with respect to certain preferred embodiments of features thereof. In particular, the principles of the present invention specifically contemplate the utilization of alternative compliant gate geometries, gate angles, molding or encapsulating compounds, or the practice of the principles herein outlined on alternative apparatus requiring packaging by plastic encapsulation. However, it should be readily apparent to those of ordinary skill in the art that various changes and modifications in form and detail may be made without departing from the spirit and scope of the invention as set forth in the appended claims. The invention disclosed herein may be practiced without any element which is not specifically disclosed herein.

What is claimed is:

1. Apparatus for forming molded plastic electronic packages, said apparatus comprising:

a source for viscous encapsulant;

means, in operative combination with said source for viscous encapsulant, for inducing pressure on said encapsulant;

a mold for forming said packages;

compliant gate means, in operative combination with said source for viscous encapsulant, said means for inducing pressure on said encapsulant, and said mold, said compliant gate means for providing a path from said source for viscous encapsulant to said mold and for reducing warpage in said plastic electronic packages;

a second mold for forming said packages;

a second compliant gate means in operative combination with said source for viscous encapsulant, said means for inducing pressure on said encapsulant and said second mold, said second compliant gate means for providing a path from said source for viscous encapsulant to said second mold and for reducing warpage in said plastic electronic packages wherein said second compliant gate means is a shallowly tapered gate, which has an included angle in the range of about 4° to about 7°;

a third mold for forming said packages;

a third compliant gate means in operative combination with said source for viscous encapsulant, said means for inducing pressure on said encapsulant and said third mold, said third compliant gate means for providing a path from said source for viscous encapsulant to said third mold and for reducing warpage in said plastic electronic packages wherein said third compliant gate means is a shallowly tapered gate, which has an included angle in the range of about 4° to about 7°;

a fourth mold for forming said packages; and a fourth compliant gate means in operative combination with said source for viscous encapsulant, said means for inducing pressure on said encapsulant and said fourth mold, said fourth compliant gate means for providing a path from said source for viscous encapsulant to said fourth mold and for reducing warpage in said plastic electronic packages wherein said fourth compliant gate means is a shallowly tapered gate, which has an included angle in the range of about 4° to about 7°; and wherein said compliant gate means is a shallowly tapered gate wherein said shallowly tapered gate has an included angle in the range of about 4° to about 7°, and wherein all included angles of every compliant gate means in operative combination with said source for viscous encapsulant including the included angle of the compliant gate means, the included angle of the second compliant gate means, the included angle of the third compliant gate means, and the included angle of the fourth compliant gate means, are all equal to each other.

2. Apparatus for forming molded plastic electronic packages, said apparatus comprising:

a source for viscous encapsulant;

means, in operative combination with said source for viscous encapsulant, for inducing pressure on said encapsulant;

a mold for forming said packages; and compliant gate means, in operative combination with said source for viscous encapsulant, said means for inducing pressure on said encapsulant, and said mold, said compliant gate means for providing a path from said source for viscous encapsulant to said mold and for reducing warpage in said electronic packages, wherein said compliant gate means comprises a shallowly tapered gate with an included angle of about 5°.

3. Apparatus for forming molded plastic electronic packages, said apparatus comprising:

a source of viscous encapsulant;

means, in operative combination with said source for viscous encapsulant, for inducing pressure on said encapsulant;

a plurality of molds for forming said packages; and a plurality of shallowly tapered compliant gates, wherein all gates are in operative combination with said source for viscous encapsulant, said means for inducing pressure on said encapsulant, and a mold of said plurality of molds, and having an included angle in the range of about 2° to about 10°, said plurality of shallowly tapered compliant gates provide means for providing paths from said source for viscous encapsulant to each mold of said plurality of molds while mechanically decoupling said packages from said source for viscous encapsulant.

4. Apparatus for forming molded plastic electronic packages, said apparatus comprising:

a source of viscous encapsulant;

means, in operative combination with said source for viscous encapsulant, for inducing pressure on said encapsulant;

a plurality of molds for forming said packages; and a plurality of serpentine compliant gates, in operative combination with said source for viscous encapsulant, said means for inducing pressure on said encapsulant, and a mold of said plurality of molds, wherein each said serpentine compliant gate of said plurality of serpentine compliant gates provides a path from said source for viscous encapsulant to a mold of said plurality of molds while mechanically decoupling said packages from said source for viscous encapsulant, wherein each mold of the plurality of molds is connected to a serpentine compliant gate of the plurality of serpentine compliant gates and wherein all serpentine compliant gates have a first U-shape bend and a second U-shaped bend and wherein each serpentine compliant gate has the same serpentine shape.

5. The apparatus, as recited in claim 3, wherein the included angles of each of the plurality of shallowly tapered compliant gates are equal to each other.

6. The apparatus, as recited in claim 5, wherein the plurality of shallowly tapered compliant gates, comprises;

a first shallowly tapered compliant gate;

a second shallowly tapered compliant gate;

a third shallowly tapered compliant gate; and a fourth shallowly tapered compliant gate.

7. The apparatus, as recited in claim 6, wherein each mold of the plurality of molds has a height, and wherein each of the plurality of gates has a height, wherein the height of the gates is greater than the height of the molds.

8. The apparatus, as recited in claim 6, wherein the included angles of each of the plurality of shallowly tapered compliant gates is between 4° to 7°.

9. The apparatus, as recited in claim 3, wherein the plurality of shallowly tapered compliant gates, comprises;

a first shallowly tapered compliant gate;

a second shallowly tapered compliant gate;

a third shallowly tapered compliant gate; and a fourth shallowly tapered compliant gate.

10. The apparatus, as recited in claim 9, wherein the included angles of each of the plurality of shallowly tapered compliant gates is between 4° to 7°.

* * * * *